United States Patent [19]

Kiczek

[11] 4,445,427

[45] May 1, 1984

[54] POPCORN POPPER

[76] Inventor: Casimir R. Kiczek, 27109 Kingswood Dr., Dearborn Heights, Mich. 48127

[21] Appl. No.: 216,158

[22] Filed: Dec. 15, 1980

[51] Int. Cl.³ .............................................. H23L 1/18
[52] U.S. Cl. .................. 99/323.5; 99/323.11
[58] Field of Search ................. 99/323.5, 323.6, 323.7, 99/323.8, 323.9, 323.11; 426/469

[56] References Cited

U.S. PATENT DOCUMENTS

| | | | |
|---|---|---|---|
| 3,756,139 | 9/1973 | Wolens | 99/323.5 |
| 3,847,067 | 11/1974 | Munsey | 99/323.8 |
| 4,138,937 | 2/1979 | Weese | 99/323.5 |

Primary Examiner—Robert W. Jenkins
Attorney, Agent, or Firm—Norbert M. Lisicki

[57] ABSTRACT

A popcorn popper including a receptacle for receiving corn which has been popped and a popping vessel centrally mounted to the receptacle. The popping vessel receives heating oil and kernels of unpopped corn therein which are heated to the popping temperature to pop the kernels of corn to form popcorn. A deflecting mechanism is provided so as to deflect the corn which has been popped upward out of the popping vessel into the receptacle. Thus, the corn which has popped is separated from the kernels of corn in the popping vessel.

9 Claims, 3 Drawing Figures

POPCORN POPPER

FIELD OF THE INVENTION

The present invention relates to a device for popping kernels of corn. More particularly, the present invention relates to a device for popping kernels of corn by heating a mixture of oil and popcorn to the popping temperature and for serving the popcorn therein.

BACKGROUND OF THE INVENTION

Popcorn was discovered by the American Indians many thousands of years ago. The American Indians had many different ways to pop kernels of corn. One known way was to hold an ear of corn over a fire. This, however, was not very satisfactory since many kernels of popped corn were lost in the fire. Another known way was to throw a handful of kernels of corn into the fire. The popcorn popped out of the fire in many different directions so that there was a problem of gathering the popped kernels of corn. A third known method of making popcorn required filling pots with hot sand, throwing in kernels of corn, and stirring the mixture with a stick. As the kernels of corn popped, the popcorn came to the top of the sand. The popcorn was easy to gather, but there was a tendency for grains of sand to mix with the popcorn so that the popcorn was gritty.

Today, popcorn is still a favorite snack of many people of America. Over 60% of the popcorn consumed today is popped at home.

There are many known prior art devices designed to pop corn at home. In U.S. Pat. No. 2,570,126 to Hobbs, a device is disclosed wherein oil and the kernels of corn are placed in a pot which is provided with a lid and stirrer. The pot is then placed on a stove for heating the bottom of the pot. The pot is covered by the lid and the stirrer is turned manually to prevent the popped corn from scorching. This device does not separate the popped corn from the unpopped kernels during the heating stage.

Another prior art device is shown in U.S. Pat. No. 3,611,910 to Hughes. In this device, corn is mixed with oil in a shallow base which is heated and covered by a substantially large dome so that the popped corn rises into the dome. This device does not separate the unpopped kernels from the popped popcorn during the heating stage. Consequently, all too often, many kernels of corn are unpopped even under the best conditions.

Finally, U.S. Pat. No. 3,756,139 to Wolens utilizes a stream of hot air to heat the kernels of corn to a popping temperature. The stream of air drives the popped corn out of the popping vessel and into a receptacle. While the device separates the unpopped kernels of corn from the popped popcorn, the popcorn is not lightly coated with oil so that crystals of salt do not easily adhere to the popcorn. It is well known that salt significantly enhances the taste of popcorn.

SUMMARY OF THE INVENTION

Typically, not all of the kernels of popcorn to be popped will pop because the kernels are not raised to the popping temperature. This is especially true where popped popcorn and the kernels of corn are mixed in a pot. The popped popcorn may move the kernels of corn away from the heating element and the popped popcorn absorb some of the heat input to pop the corn. By quickly separating the popped popcorn from the unpopped kernels of corn during the heating stage of making popcorn, a greater number of unpopped kernels of corn will be raised to the popping temperature. Thus, a higher quality of popcorn can be served.

The present invention provides a device and method for heating oil and kernels of unpopped corn to make popcorn. The device has a receptacle for receiving corn which has been popped. Within the receptacle is a popping vessel which receives the oil and the kernels of unpopped corn therein. A heater is provided for heating the oil and the kernels of corn in the popping vessel to the popping temperature to pop the corn. Finally, a deflector is provided to deflect the corn which has been popped upward out of the popping vessel and into the receptacle.

Therefore, it is a primary object of the present invention to provide a device for popping corn with oil which deflects the corn which has been popped upward out of the popping vessel into the receptacle to separate the popped corn from the unpopped kernels of corn.

It is another object of the present invention to provide a device which pops corn using oil so that the popcorn is coated with a slight coating of oil to enhance the adherance of salt to the popcorn.

It is still another object of the present invention to provide a device which heats a popping vessel which has oil and kernels of unpopped corn therein, which requires less energy to heat to the popping temperature since the surface area to volume of oil and kernels of unpopped corn is significantly reduced over known prior art designs.

It is yet still another object of the present invention to provide a device to pop corn which is simple and inexpensive to make.

It is still yet another object of the present invention to provide a method for popping kernels of corn in a heated vessel filled with oil and deflecting the popcorn into a receptacle.

Other objects of the invention will become apparent by reference to the detailed description and the drawings.

BRIEF DESCRIPTION OF THE DRAWINGS

FIG. 3 is a side view of the popper in an inverted position with the base or cover separated from the dome or bowl, and with the dome or bowl turned relative to the base to enable the base to be lifted there from and further showing the popped corn in the bowl for serving there from.

DESCRIPTION OF THE PREFERRED EMBODIMENT

Figure 1:
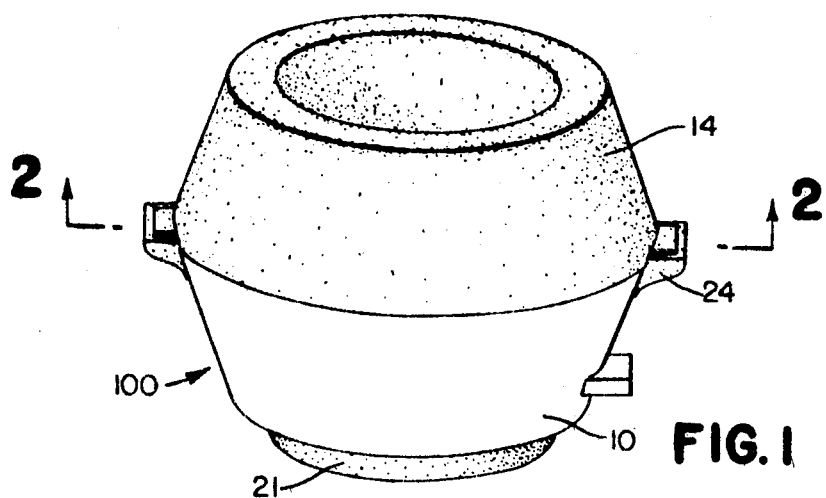
FIG. 1 is a perspective view of the corn popper according to my invention.
Figure 2:
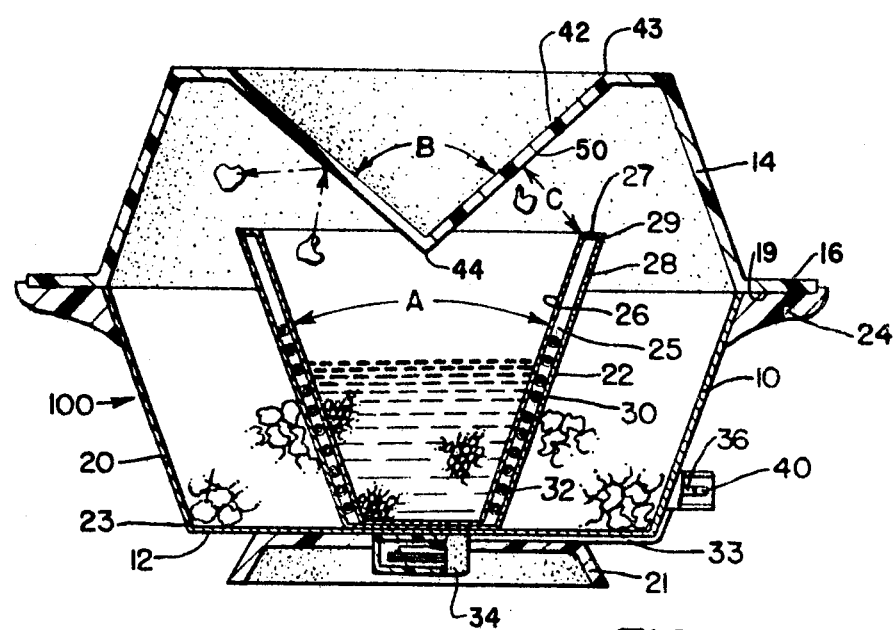
FIG. 2 is a side sectional view taken along line 2—2 of FIG. 1.

Referring to the drawings, the corn popper according to the present invention is generally designated by the numeral 100. The corn popper 100 includes a base member or receptacle 10 and a dome or bowl member 14.

The base member or receptacle means 10 comprises a housing member 20, a popping vessel 22, and support means including a pan housng member 12 with legs or base support 21 and a pair of handles 24. The pan housing member 12 is a round plate which is suitably fastened such as by welding to one end 23 of the housing member 20. The popping vessel 22 is centrally mounted and suitably fastened to the pan housing member 12 as by conventional rivets, screw fasteners, welding or soldering so that the popping vessel is capable of holding a liquid therein without leaking. The preferred shape of the popping vessel is a hollow truncated cone which expands diametrically from the pan housing member 12. The hollow cone has an inner surface 26, an outer surface 28, and a lip 27 which bridges the inner and outer surfaces 26, 28 respectively at its larger diametrical end 29. A heating element assembly 30 is suitably fastened to the popping vessel 22 in the inner cavity 25 formed between the wall or the inner surface 26, the outer surface 28, which is preferably coated with a thermally insulated material, and the lip 27 of the hollow truncated cone. The heating element is disposed in the inner cavity 25 and extends toward the lip 27 from the junction of the popping vessel 22 to housing member 20. The heating element 30 is of conventional construction and comprises a helical heating element 32. A thermostatic switch 34 and a pair of electrical inlet prongs are connected electrically by a pair of wires 33, the heating element 30 and the thermostatic switch 34 are connected electrically in series.

The housing member 20 comprises a shell preferably generally conical in shape although any suitable outer shape is acceptable in practicing my invention. The housing member 20 has a round rim. Near the junction of the housing member 20 and the pan housing member 12, an electrical holder 40 is suitably mounted to the outer wall of the shell. The electrical holder 40 is of such a shape as to receive a conventional female socket plug of an electrical line cord. The base support 21 is preferably of the shape of an inverted truncated cone which is suitably fastened to the conical housing member 12 so that when the pan is supported by the base support on a generally horizontal surface, the rim of the shell is generally horizontal also. The pan housing member 12 or lid member 12 is fastened to the rim of the housing member 20 and the lid member 12 extends generally horizontally when the housing member 20 is placed on a generally horizontal surface.

The handles 24, which in the preferred embodiment are two in number, are diametrically disposed adjacent the rim of the shell of the housing member 20. The handles 24 are fastened to the housing member 20 as by conventional fastener means such as screw threaded members. Each handle has a flat planar portion 25 which is disposed horizontally when fastened onto the housing member 20 for a purpose to be described later herein.

The dome or bowl member 14 is preferably made of transparent plastic material. The dome is capable of withstanding sudden and severe temperature changes. The dome has a rim portion 16 with a pair of diametrically disposed handles 18 extending from the rim portion 16. Each of the handles has a flat planar portion 19. The flat planar portion 19 of the handles 18 of the dome member 14 cooperatively engage the flat planar portion 25 of the handles 24 of the housing member 20, so that the dome member 14 is supported by the handles 18. In addition, the rim portion 16 of the dome member 14 cooperates with rim portion of the housing member 20 for further support. The dome member 14 includes a deflector member 50. The deflector member 50 is fastened to the dome member to project centrally into the popping vessel 22 when the dome 14 is mounted on the housing member 20. The deflector member 50 is preferably a right circular cone 42 with a base 43 and an apex 44 which projects into the popping vessel 22 and is generally centrally located therewith. The deflector member deflects any popped corn kernels which burst by heat from the popping vessel 22 so that the popped corn kernels are collected in the lid member 12. To accomplish this the Angle B of the deflector is greater than the Angle A of the popping vessel. Furthermore, the popping vessel must be separated from the deflector by at least the width of a popped popcorn as shown by the Gap C.

OPERATION

To use the popcorn popper 100, the base member 10 is placed with legs 21 on a suitable surface so that the lid member 12 is disposed horizontally, that is, facing upwardly. With the dome 14 removed, popcorn kernels and a suitable amount of cooking oil are placed into the popping vessel 22. The dome 14 is placed over the lid member 12 such that the handles 18 cooperatively engage the handles 24 of the housing member 20. In addition, the rim portion 16 of the dome 14 cooperatively engages the rim portion of the housing member 20 and the apex 44 projects into the popping vessel 22 and is generally centrally located therewith. A female plug (not shown) of a line cord is connected to a suitable source of electrical current (not shown) and the plug is brought into contact with the inlet prongs 36. This completes the electrical circuit so that electrical current flows through the heating element 32. Thus, the heating element 32 commences to emit heat. The heat thus emitted from the heating element 32 is conducted by the walls of the popping vessel 22 to the cooking oil and the popcorn kernels. In a short period of time, the cooking oil is raised to at least the corn popping temperature and the popcorn kernels begin to pop to form heated popcorn. The popcorn kernels have a great tendency to jump or leap from the surface of the heated cooking oil and form popcorn upon reaching the corn popping temperature. The present invention utilizes this tendency to jump by the popped popcorn to advantage by providing a popping vessel 22 and deflector member 50 which deflects the jumping popcorn through the Gap C into the volume between the dome and the lid. Thus, the popcorn is separated from the cooking oil and the unpopped corn kernels. This accomplishes two important aspects of the present invention. First, the popcorn that leaves the popping vessel no longer absorbs any of the heat emitted by the heating element 30 into the oil and the unpopped kernels of corn in the popping vessel 22. Thus, the cooking process proceeds more effectively since less heat is required to cook the remaining unpopped kernels of corn. Secondly, the surface area of unpopped kernels of corn in cooking oil remains relatively constant in the popping vessel 22 because the popped kernels of corn or popcorn are removed from the popping vessel 22. Thus, the kernels of corn when they reach the popping temperature, pop to form popcorn and in the process leap from the cooking area in the popping vessel 22, as the case may be, are deflected by the deflector member 50 into the housng member 20. By permitting the escape of the popcorn from the popping vessel 22, any popcorn formed thereafter is substantially less prone to meet a previously formed popcorn in the popping vessel 22. Therefore, the popcorn is able to leap from the popping vessel unencumbered by the previously formed popcorn and thus separate the popcorn from the unpopped kernels of corn.

Figure 3:
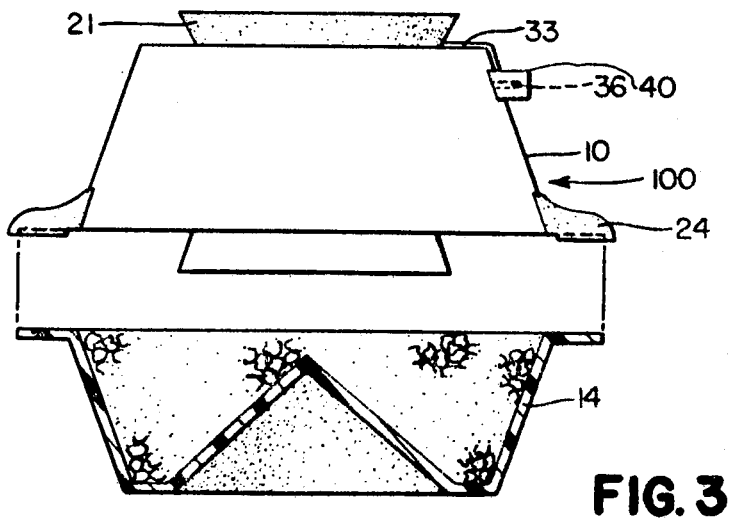

After the popping temperature has been exceeded by a selected increment of temperature for a selected period of time, the thermostatic switch 34 opens to cut the electrical circuit and thus, the device 100 cools off. The base member 10 and the bowl member 14 are in unison turned over such that the base member is supported by the bowl member 14 as is shown in FIG. 3. The base member 10 is removed then so that the bowl member 14 is used to serve the popcorn therein. While the invention has been described with reference to a preferred embodiment, it is understood that various modifications can be made to the described invention without departing from the scope of the invention. On the contrary, the invention is intended to cover all such modifications as fall within the spirit and scope of the invention and the appended clause.

What is claimed is:

1. A device for heating oil and kernels of unpopped corn on a surface to make popcorn, said device comprising:
   receptacle means, disposed on said surface, for receiving corn which has been popped;
   a popping vessel mounted to said receptacle means, said popping vessel receiving the oil and the kernels of unpopped corn therein;
   means, attached to said popping vessel, for heating the oil and the kernels of unpopped corn such that the kernels of unpopped corn are heated to the popping temperature to pop the kernels of unpopped corn to form popcorn; and
   means, disposed above said heating means, for deflecting the corn which has been popped upward as a result of forming popcorn out of said popping vessel into said receptacle means so as to separate the corn which has been popped from the kernels of unpopped corn in said popping vessel, said deflecting means further having a deflector member disposed toward said popping vessel.

2. A device as claimed in claim 1 further comprising a dome member separately supported on said receptacle means over said popping vessel.

3. A device as claimed in claim 2 further comprising means for removably engaging said receptacle means and said dome together.

4. A device as claimed in claim 2 wherein said dome member having an inside volume for storing and serving the popped corn therein after the corn has popped.

5. A device as claimed in claim 1 wherein said heating means further comprises:
   electrical heating means, mounted to said popping vessel adjacent said receptacle means, for supplying heat to said popping vessel and the oil and the kernels of unpopped corn to the popping temperature to pop the corn to make popcorn.

6. A device as claimed in claim 1 wherein said receptacle means further comprising:
   a housing member;
   means, attached to said housing member, for supporting said housing member in a popping position on said flat surface; and
   a pair of handles extending radially outward from said housing member, one of said pair of handles mounted opposite to the other.

7. A device as claimed in claim 6 wherein said pair of handles are arranged for inverting said receptacle and said deflecting means together.

8. A device for heating oil and kernels of unpopped corn on a flat surface to make popcorn, said device comprising:
   receptacle means, disposed on said flat surface, for receiving corn which has been popped, said receptacle means further comprising:
   a housing member;
   means, attached to said housing member, for supporting said housing member in a popping position on said flat surface; and
   a pair of handles extending radially outward from said housing member, one of said pair of handles mounted opposite to the other;
   a popping vessel mounted to said receptacle means, said popping vessel receiving the oil and the kernels of unpopped corn therein;
   a dome member separately supported on said receptacle means over said popping vessel;
   means, adjacent said popping vessel, for heating the oil and the kernels of unpopped corn such that the kernels of unpopped corn are heated to the popping temperature to pop the kernels of corn to form popcorn; and
   means, attached to said dome member and disposed above said heating means, for deflecting the corn which has popped outwardly of said popping vessel into said receptacle means so as to separate the corn which has been popped from the kernels of unpopped corn in said popping vessel, said deflecting means further including:
   a deflector member mounted to said dome and disposed toward said popping vessel, said deflector member further including:
   a conical member, said conical member having a base end and an apex disposed opposite said base end.

9. A device as claimed in claim 8 wherein said conical member is a right circular cone.

* * * * *